US006997569B2

(12) United States Patent
Brouwer et al.

(10) Patent No.: US 6,997,569 B2
(45) Date of Patent: Feb. 14, 2006

(54) ACTUATOR MECHANISM FOR ADJUSTING THE ANGULAR POSITION OF A MIRROR ELEMENT IN A WING MIRROR FOR A MOTOR VEHICLE; AND WING MIRROR FOR A MOTOR VEHICLE PROVIDED WITH AN ACTUATOR MECHANISM

(75) Inventors: Stefan Frits Brouwer, Den Haag (NL); Marinus Roose, Nieuwegein (NL)

(73) Assignee: Eaton Corporation, Cleveland, OH (US)

( * ) Notice: Subject to any disclaimer, the term of this patent is extended or adjusted under 35 U.S.C. 154(b) by 57 days.

(21) Appl. No.: 10/469,097

(22) PCT Filed: Feb. 27, 2002

(86) PCT No.: PCT/NL02/00128

§ 371 (c)(1),
(2), (4) Date: Jan. 23, 2004

(87) PCT Pub. No.: WO02/068242

PCT Pub. Date: Sep. 6, 2002

(65) Prior Publication Data

US 2004/0105178 A1    Jun. 3, 2004

(30) Foreign Application Priority Data

Feb. 28, 2001   (NL)   .................................... 1017466

(51) Int. Cl.
   *G02B 7/182*   (2006.01)
(52) U.S. Cl. ..................................................... 359/877
(58) Field of Classification Search ................. 359/871, 359/872, 877
   See application file for complete search history.

(56) References Cited

U.S. PATENT DOCUMENTS 3,493,295 A  *  2/1970  Kobrehel .................... 359/877

* cited by examiner

*Primary Examiner*—Euncha P. Cherry
(74) *Attorney, Agent, or Firm*—Anna M. Shih

(57) ABSTRACT

Actuator mechanism for adjusting the position of a mirror element in a wing mirror for a motor vehicle, comprising an electric motor and a mirror adjusting element movably coupled therewith via a drive train. The drive train comprises a main gear which is included in the drive train nearer to the mirror adjusting element and further comprises a pinion being in mesh with the main gear, which pinion is included in the drive train nearer to the electric motor. The main gear and the pinion cooperate through an evoloid toothing. The invention also relates to a wing mirror for a motor vehicle in which at least one actuator mechanism is included.

5 Claims, 3 Drawing Sheets

ACTUATOR MECHANISM FOR ADJUSTING THE ANGULAR POSITION OF A MIRROR ELEMENT IN A WING MIRROR FOR A MOTOR VEHICLE; AND WING MIRROR FOR A MOTOR VEHICLE PROVIDED WITH AN ACTUATOR MECHANISM

TECHNICAL FIELD

The invention relates to an actuator mechanism for adjusting the angular position of a mirror element in a wing mirror for a motor vehicle, comprising an electric motor and a mirror adjusting element movably coupled therewith via a drive train.

BACKGROUND OF THE INVENTION

It is generally known that motor vehicles, such as automobiles, are provided with aids to enable observation of what is happening on the side of and behind the automobile. Often, such aids are designed as wing mirrors. Normally, a wing mirror comprises a cupshaped housing which is fitted on a more forward part of the side of the motor vehicle and in which a mirror element is accommodated. The mirror element is often substantially plate-shaped and includes an angle with the main axis of the motor vehicle both in the horizontal plane and in the vertical plane. The horizontal and the vertical angles depend inter alia on the length and the personal preferences of the driver of the motor vehicle. To enable the desired angles for each driver to be set, the mirror element is connected with the mirror housing so as to be pivotable about at least one pivoting axis, but often about two pivoting axes mutually including a right angle.

Because the angles desired by a driver can normally be assessed only from the driver's seat of the vehicle, and because the driver normally cannot adjust the mirror element manually from this position, it is desirable that the position of the mirror element in the wing mirror can be adjusted remotely by means of an actuator mechanism.

Preferably, the actuator mechanism then comprises an electric motor and a mirror adjusting element movably coupled therewith via a drive train. Owing to the use of an electric motor, the actuator mechanism can be made of relatively compact design, while with the aid of the drive train, a relatively fast rotation of the output shaft of the electric motor can be converted into a relatively slow movement of the adjusting element, so that the angular position of the mirror element in the wing mirror can be accurately set.

To realize, with the aid of the drive train, an appropriate reducing transmission between the electric motor and the mirror adjusting element, it has previously been proposed to implement the drive train as a gear train, the gears of which are provided with a conventional involute toothing.

Although an actuator mechanism provided with such a gear train can be manufactured at a relatively low cost price, such a conventional involute gear train has the disadvantage that a continuous mesh between two cooperating gears can only be realized when each gear carries at least six teeth along the circumference. In view of the limited construction space available for the actuator mechanism in the mirror housing, the gear train must consequently be implemented in practice with several transmission steps to realize the relatively large reduction of the rotational speed of the output shaft of the electric motor that is required for this application. This has as a disadvantage not only that the manufacturing costs of the drive train increase, but also that the efficiency of the transmission decreases, so that a heavier and more expensive electric motor must be chosen. In addition, the use of several transmission steps in the gear train leads to a greater play in the drive, which, during use, may lead to an undesirable vibration of the mirror element coupled with the mirror adjusting element.

Because of the above-mentioned problems, mirror actuator mechanisms are designed with a drive train which comprises a worm mounted on the output shaft of the electric motor, which worm drives a worm wheel. Such a mirror actuator mechanism is described in the German patent application DE 199 12 685. In this actuator mechanism, the worm wheel is provided with an inner thread which is in engagement with a spindle provided with an outer thread, which spindle forms the mirror adjusting element. During use, the worm mounted on the output shaft of the electric motor causes the worm wheel to rotate, while the inner thread of the worm wheel in engagement with the outer thread of the spindle functions as a rotation-translation converter, so that the spindle can move back and forth along the axis of the worm wheel. To enable manual adjustment of the mirror element in case of failure of the electric motor, the inner thread is connected with the worm wheel in a radially resilient manner, so that through elastic deformation the connection between inner thread and outer thread can be temporarily broken. As a result, the mirror adjusting element can be displaced in axial direction by jerks when the mirror element is pivoted manually relative to the mirror housing.

A disadvantage of the known actuator mechanism equipped with a worm wheel transmission is that it is relatively complex to manufacture and that it has a still lower efficiency, so that a relatively large and expensive electric motor must be chosen after all.

SUMMARY OF INVENTION

The object of the invention is to provide an actuator mechanism of the type mentioned in the preamble, with which the above-mentioned disadvantages can be avoided. To that end, the actuator mechanism according to the invention is characterized in that the drive train comprises a main gear which is included in the drive train nearer to the mirror adjusting element and a pinion being in mesh with the main gear, which pinion is included in the drive train nearer to the electric motor, while the main gear and the pinion are provided with an evoloid toothing.

In this context, an evoloid toothing in a pinion as a driving gear is understood to be a pinion with a toothing according to DIN 3960, wherein the number of teeth Z is less than 6, preferably 2 or 3;
the tooth angle $\beta$ is greater than 15°;
the profile correction ×1 of the pinion is greater than 0.5;
the profile correction ×2 of the main gear is less than or equal to 0;
the tooth root height factor $h_{Ffp2}$ of the main gear is greater than or equal to the tooth head height factor $h_{aP1}$ of the pinion; and
the tooth head height factor $h_{aP2}$ of the main gear is substantially equal to the tooth root height factor $h_{Ffp1}$ of the pinion. The evoloid main gear then has a corresponding toothing.

Such an evoloid toothing is a special variant of the involute toothing and is discussed in more detail by K. Roth in Zahnrad Technik—Evolventen Sonderverzahungen, Springer Verlag ISBN 3-540-64236-6. In particular, through the use of the evoloid toothing, a pinion can be equipped with fewer than six teeth extending at a slant along the circumference of the pinion, which teeth are shaped such that in cooperation with a corresponding evoloid main gear, always at least one tooth of the pinion is in mesh.

Accordingly, through the use of an evoloid toothing, a continuous mesh can be ensured also when a gear carries five or fewer teeth at its circumference. By having the pinion any fewer than 6, preferably 2 or 3 evoloid teeth, it is possible, with a single gear step, still to realize a sufficiently high transmission ratio. Through the use of such a singular gear transmission in the drive train, the driving efficiency can be high, so that the electric motor can be selected to be relatively small and inexpensive. In addition, only a limited number of parts are needed for the drive train, so that lesser play occurs.

The invention is based on the insight that the road of a drive train provided with gears, previously abandoned for actuator mechanisms for wing mirrors, can still be followed by the use of an evoloid toothing, known per se.

Further, what can be realized through the use of the evoloid gear transmission is that the longitudinal axis of the motor runs parallel to the rotation axis of the main gear, so that the actuator mechanism can be made of compact design.

Advantageously, the drive train is of self-locking design, preferably in that the pinion is provided with a bearing cylinder extending coaxially with respect to the centerline of the pinion, while the diameter of the bearing cylinders greater than the diameter of the toothing. What is thereby achieved is that the drive train is self-locking when upon manual adjustment of the angular position of the mirror element relative to the housing, the main gear drives the pinion. It is noted that by the use of the bearing cylinder, in an elegant manner the evoloid toothing's tendency towards self-locking, already inherently present, can, with a simple measure, be sufficiently enhanced to function with sufficient operational reliability in a mirror actuator mechanism.

In a further advantageous embodiment, furthermore, a slip coupling is included between the main gear and the mirror adjusting element in the drive train. What can thus be achieved is that upon manual adjustment of the mirror element the rotation shaft of the electric motor is not driven.

The invention further relates to a wing mirror for a motor vehicle, comprising a substantially cup-shaped mirror housing and a mirror element arranged to be pivotable relative thereto about at least one pivoting axis, and an actuator mechanism for adjusting the angular position of the mirror element relative to the mirror housing by pivoting the mirror element, the actuator mechanism comprising an electric motor connected with the mirror housing, and a mirror adjusting element movably coupled with the motor via a drive train and connected with the mirror element, the drive chain comprising a main gear which is included in the drive train nearer to the mirror adjusting element and further comprising a pinion being in mesh with the main gear, which pinion is included in the drive train nearer to the electric motor, while further the main gear and the pinion cooperate through an evoloid toothing.

Further advantageous embodiments of the invention are represented in the subclaims.

The invention will be further elucidated on the basis of an exemplary embodiment which is represented in a drawing.

BRIEF DESCRIPTION OF THE DRAWINGS

In the drawing.

It is noted that the figures are only schematic representations of a preferred embodiment of the invention. In the figures, the same or corresponding parts are indicated by the same reference numerals.

DETAILED DESCRIPTION OF THE EMBODIMENTS

Figure 1:
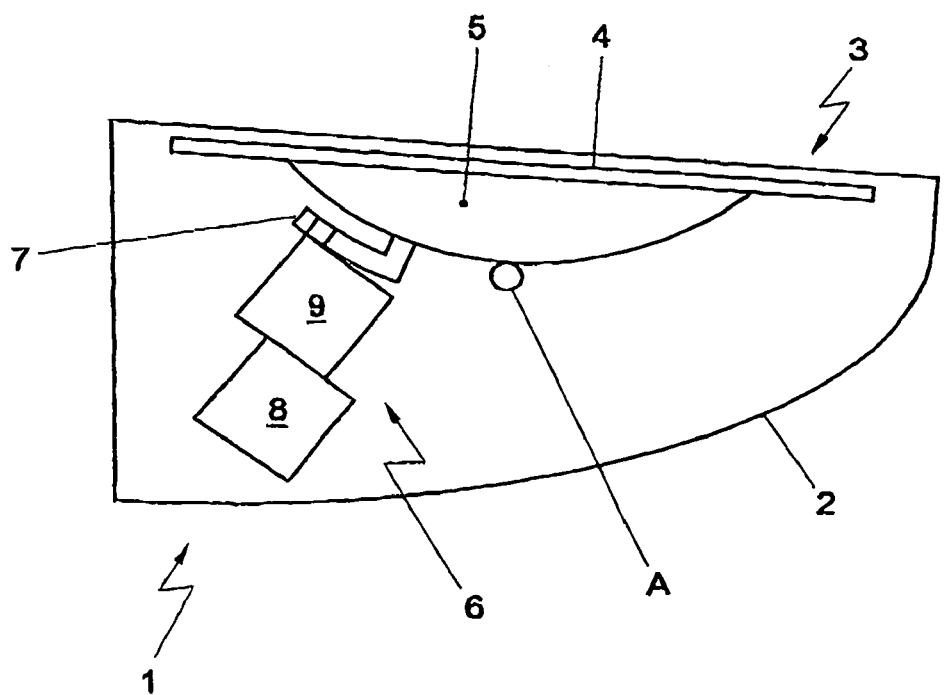
FIG. 1 shows a schematic top plan view in cross section of a wing mirror with an actuator mechanism according to the invention.

FIG. 1 shows a wing mirror 1 for a motor vehicle. The wing mirror 1 is provided with a substantially cup-shaped mirror housing 2 and a mirror element 3 arranged to be pivotable relative thereto about one pivoting axis A. The mirror element 3 comprises a mirror plate 4 and a carrier 5.

The mirror housing 2 is provided with an actuator mechanism 6 including a DC electric motor 8, a drive train 9 and a mirror adjusting element 7 coupled with the mirror element 3 adjacent the carrier 5.

The construction of such a wing mirror and the manner of incorporation of one or more actuator mechanisms therein is sufficiently known to those skilled in the art and will not be further elucidated here.

Figure 2:
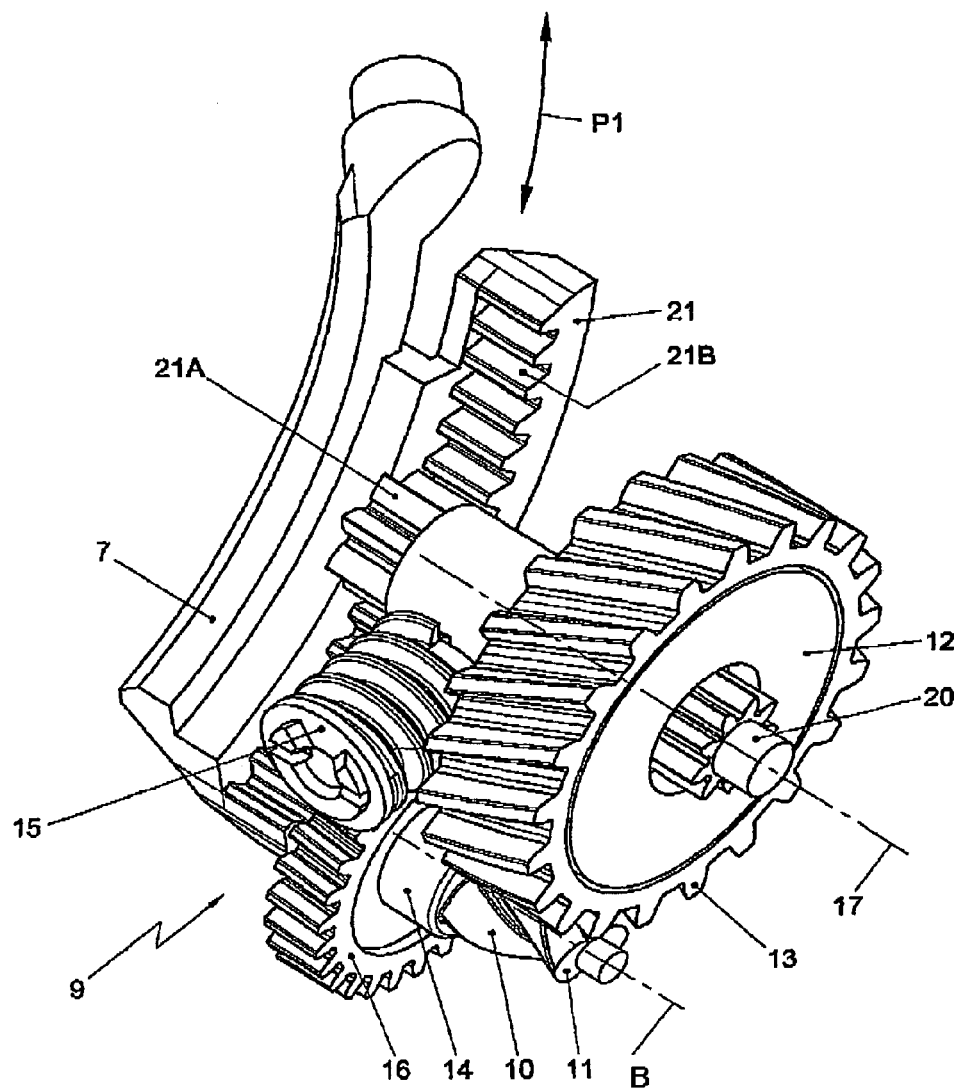
FIG. 2 shows a schematic perspective view of the drive train of the actuator mechanism of FIG. 1.

Referring to FIG. 2, there is shown that the drive train 9 of the actuator mechanism 6 is provided with a worm 15 carried on the output shaft of the DC electric motor 8. The worm 15 drives a worm wheel 16 which carries a pinion 10 extending coaxially along its rotation axis B, having two evoloid teeth 11 provided along the circumference thereof. The teeth 11 are in mesh with evoloid teeth 13 provided along the circumference of a main gear 12. The main gear has, for instance, twenty-one teeth, so that between the rotation axis B of the motor and the rotation axis 17 of the main gear 12 a reduction of 2/21 is realized.

The rotation axis B of the pinion and the rotation axis 17 of the main gear 12 are arranged parallel.

The pinion 10 is provided with a bearing cylinder 14 of a diameter D greater than the diameter D' formed by the teeth 11 of the pinion 10, so that the drive train 9 is self-locking when the mirror plate 4 is pivoted manually. For the sake of clarity, the bearing points of the drive train are not represented in the drawing.

The main gear 12 is coupled with the mirror adjusting element 7 in the direction of the double-headed arrow P1.

To that end, the main gear 12 is provided with a bore 19, extending coaxially with the output shaft 17, in which bore a pinion 20 is received. The toothing 21A of the pinion 20 meshes with the toothing 21B of the mirror adjusting element 7. The toothing of the mirror adjusting element 7 is designed as a geared segment with involute inner toothing which forms a curved tooth track 21.

Through rotation of the output shaft of the electric motor, the mirror adjusting element 7 can be moved via the drive train, back and forth in the direction of the double-headed arrow P1, so that the mirror element 3 can be pivoted about the pivoting axis A as indicated with the double-headed arrow P2 in FIG. 1.

The connection between the bore 19 of the main gear 12 and the pinion 20 is based on friction and can be temporarily broken by slip. As a result, the bore 19 and the pinion 20 form a slip coupling, so that the mirror adjusting element 7 can be manually adjusted without damage to the drive train 9.

Figure 4:
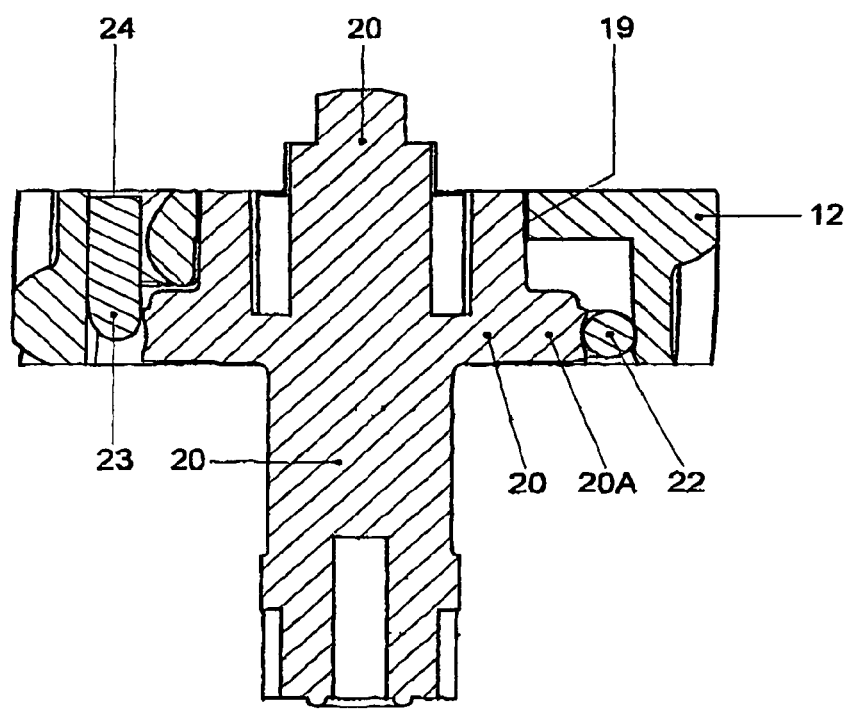
FIG. 4 shows a schematic cross section of the main gear of the actuator mechanism of FIG. 2.

Referring to FIG. 4, there is shown that the bore 19 is of stepped design and that the main gear carries a clamping ring 22 extending in the bore 19, which clamping ring 22 embraces a widened part 20A of the pinion 20. During motor-driven adjustment, the clamping ring 22 exerts a sufficiently large frictional moment on the pinion 20, so that these are coupled during use. During manual adjustment, via the pinion 20 a moment is transmitted to the clamping ring 22 that is greater than the maximum frictional moment that can be transmitted via the clamping ring between pinion 20 and main gear 12. As a result of the rotation resistance in the part of the drive train 9 located on the motor side, the pinion 20 will now slip relative to the main gear 12, so that damage of the drive train 9 is avoided and a smooth manual adjustment is possible.

The clamping ring 22 is advantageously provided with one or more pre-bent parts 28 reaching out of the plane of the ring, which parts 23 can be received in a recess 24 of the main gear to lock the clamping ring against rotation relative to the main gear 12. Elegantly, the internal diameter of the clamping ring 22 is chosen somewhat smaller than the external diameter of the widened part 20A of the pinion 20, so that the clamping ring 22 can embrace the widened part 20A of the pinion 20 with a clamped fit. Advantageously, the thickened part 20A of the pinion 20 is provided with an annular groove.

The outside of the clamping ring 22, after assembly of the pre-bent parts 23 in the recess 24, preferably lies precisely against the inside of the stepped bore 19.

It is noted that the above-described slip coupling and clamping ring can also be advantageously used as such in other applications, in particular in actuator mechanisms, in which no evoloid gear transmission is used.

Figure 3:
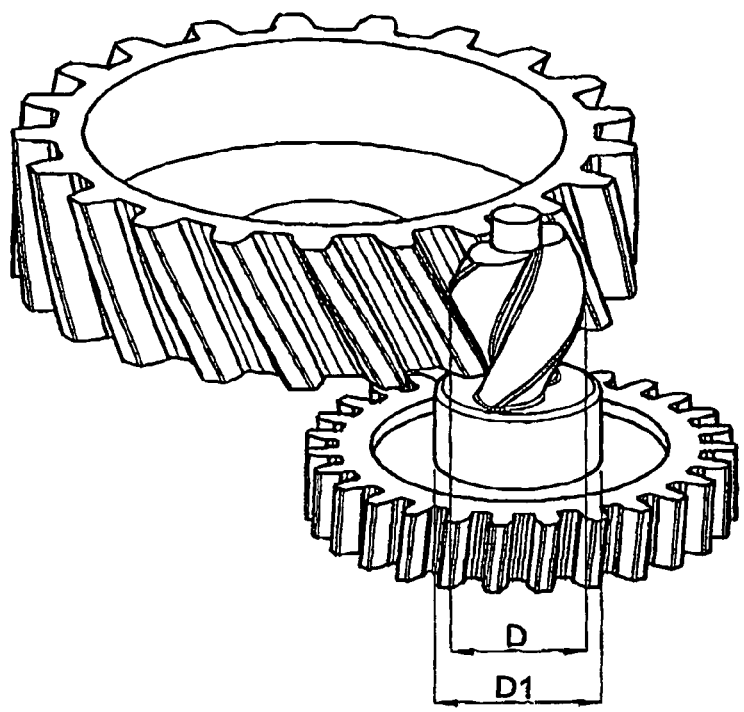
FIG. 3 shows a schematic perspective view of the pinion and a part of the main gear of the drive train of FIG. 2.

In FIG. 3 the evoloid pinion 10 and the evoloid main gear 12 are represented in detail.

It is noted that the invention is not limited to the exemplary embodiments represented here. Thus, the wing mirror can be designed with two actuator mechanisms, and the mirror element can be received in the mirror housing so as to be pivotable relative to two pivoting axes, the pivoting axes preferably including a right angle. Also, in the drive train a linear rotation-translation converter can be included. In addition, the output shaft of the electric motor may carry an evoloid pinion directly. Accordingly, the drive train can also be designed without worm wheel transmission. Further, the drive train can be designed with a multi-step evoloid gear transmission, and several evoloid pinions may drive one evoloid main gear. Also, the drive train can be equipped with an additional gear step with a conventional involute toothing. In addition, the slip Coupling can be designed in many different ways.

Such variants will be clear to those skilled in the art and are understood to fall within the scope of the invention as set forth in the following claims.

What is claimed is:

1. An actuator mechanism for adjusting the angular position of a mirror element in a wing mirror for a motor vehicle, comprising:
    an electric motor;
    a mirror adjusting element; and
    a drive train that movably couples the electrical motor and the mirror adjusting element, wherein the drive train includes
        a main gear which is included in the drive train nearer to the mirror adjusting element; and
        a pinion meshing with the main gear, wherein the pinion is included in the drive train nearer to the electric motor, while the main gear and the pinion cooperate through an evoloid toothing.

2. An actuator mechanism according to claim 1, wherein the pinion comprises fewer than six teeth.

3. An actuator mechanism according to claim 1 or 2, wherein the pinion is provided with a bearing cylinder extending coaxially with respect to the centerline of the pinion, and wherein the diameter of the bearing cylinder is greater than the diameter of the toothing of the pinion.

4. An actuator mechanism according to claim 1, wherein a slip coupling is included in the drive train between the main gear and the mirror adjusting element.

5. A wing mirror for a motor vehicle, comprising:
    a substantially cup-shaped mirror housing;
    a mirror element arranged to be pivotable relative to the mirror housing about
    at least one pivoting axis; and
    an actuator mechanism for adjusting the angular position of the mirror element relative to the mirror housing by pivoting the mirror element, the actuator mechanism including
        an electric motor connect with the mirror housing;
        a mirror adjusting element; and
        a drive train that movably couples the electric motor and the mirror adjusting element and connected with the mirror element, the drive chain having
            a main gear that is included in the drive train nearer to the mirror adjusting element; and
            a pinion meshing with the main gear, wherein pinion is included in the drive train nearer to the electric motor, and wherein the main gear and the pinion cooperate through an evoloid toothing.

* * * * *